April 16, 1946. W. R. CURTISS 2,398,359
SHIELDED SPARK-PLUG CONNECTOR
Filed May 28, 1942 2 Sheets-Sheet 2
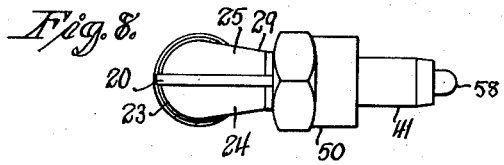
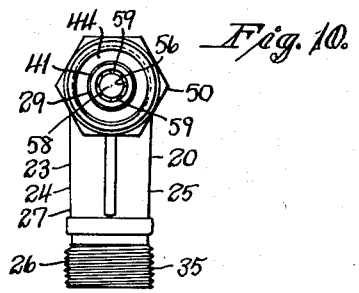
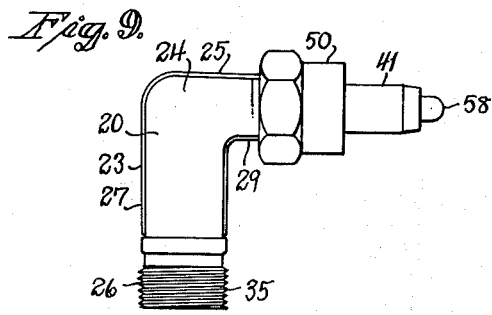
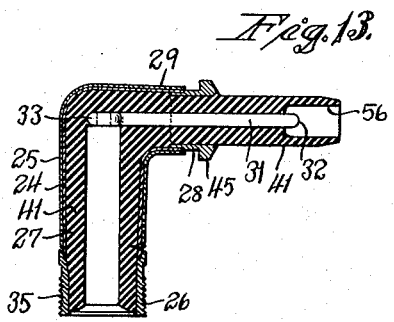
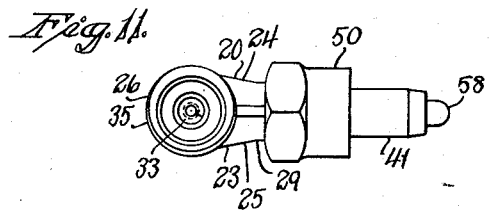
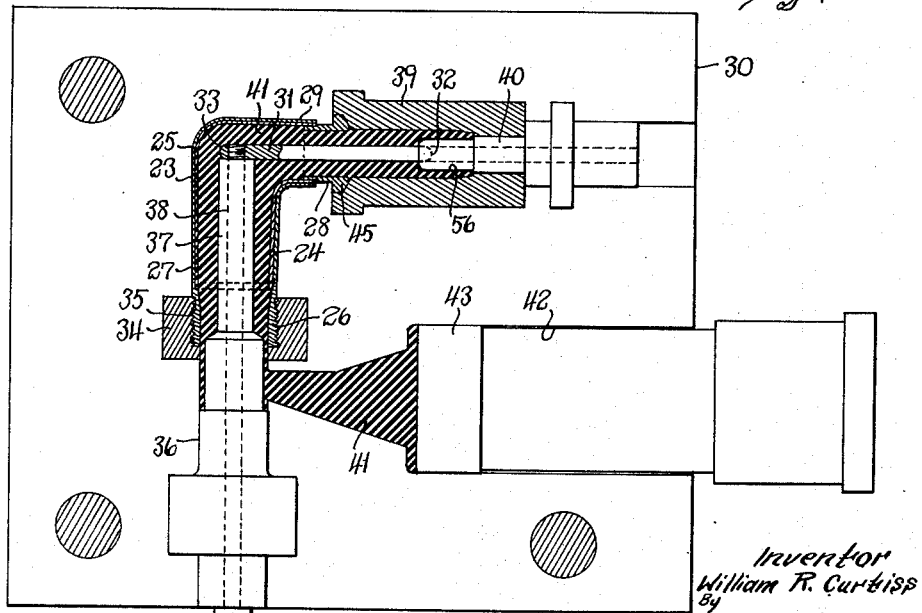
Inventor
William R. Curtiss
By
Seymour Earle Nichols
Attorneys Patented Apr. 16, 1946

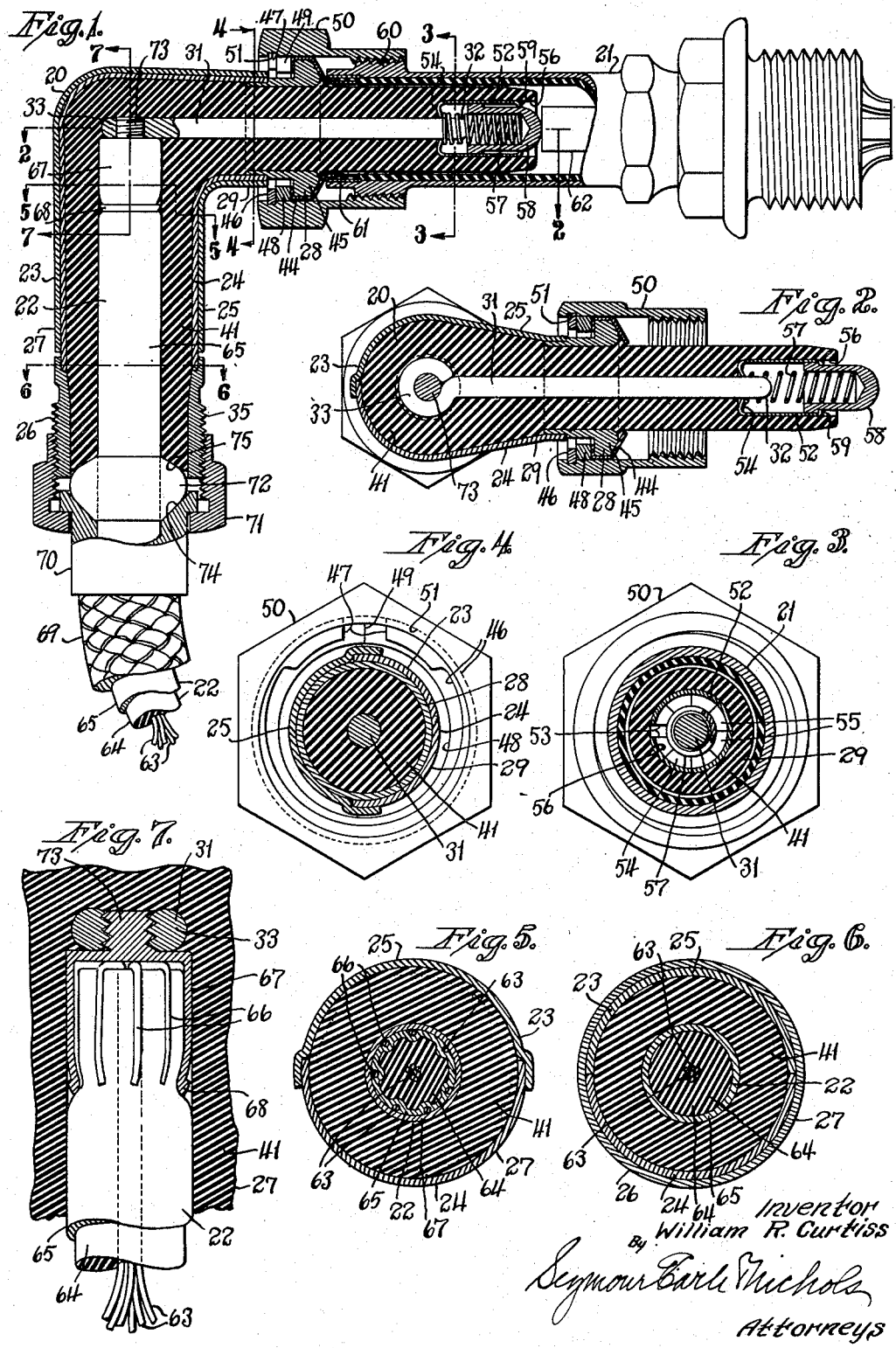

2,398,359

UNITED STATES PATENT OFFICE 2,398,359

SHIELDED SPARK-PLUG CONNECTOR

William R. Curtiss, Meriden, Conn., assignor, by mesne assignments, to Great American Industries, Inc., Meriden, Conn., a corporation of Delaware Application May 28, 1942, Serial No. 444,836

1 Claim. (Cl. 174—35)

This invention relates to improvements in shielded spark-plug connectors, and is particularly useful in connection with shielded spark-plug connectors for airplane engines.

Some gas escapes through the spark plugs of airplane engines and harmfully affects the soft rubber insulation of wires of the ignition system, and it is therefore one object of this invention to provide an improved shielded spark-plug connector which will prevent the gas from coming in contact with such soft rubber insulation.

Another object of this invention is to provide an improved shielded spark-plug connector formed of simple elements readily manufactured and readily assembled to produce an efficient, durable construction.

With the above and other objects in view, as will appear to those skilled in the art from the present disclosure, this invention includes all features in the said disclosure which are novel over the prior art.

In the accompanying drawings forming part of the present disclosure, in which one way of carrying out the invention is shown for illustrative purposes:

Fig. 1 is a longitudinal central sectional view through one form of my improved shielded spark-plug connector shown in assembled relation with connecting parts;

Figs. 2, 3, 4, 5, 6 and 7 are sectional views respectively on lines 2—2, 3—3, 4—4, 5—5, 6—6 and 7—7 of Fig. 1;

Fig. 8 is a plan view of the spark-plug connector;

Fig. 9 is a front elevation of Fig. 8;

Fig. 10 is a right side elevation of Fig. 9;

Fig. 11 is a bottom plan view of Fig. 9;

Fig. 12 is a schematic plan view of half of a molding-die with the pressure-plunger and the elbow-shell with the molded plastic therein, together with the various tool elements that are used for holding the elbow-shell and parts in proper position while the plastic is being forced into molded position, with certain parts in section; and Fig. 13 is a sectional view similar to its showing in Fig. 12, of the elbow-shell and molded plastic in finished condition.

In the description and claims, the various parts and steps are identified by specific terms for convenience, but they are intended to be as generic in their application as the prior art will permit.

Referring to the drawings showing the particular form of the invention chosen for illustration, the spark-plug connector 20 is shown (Fig. 1) as having one end connected to a spark plug 21 and the other end connected to an electrical conductor 22 for connection to the magneto or other electrical ignition source.

The connector 20 has a hollow metal elbow or shell 23 which in the particular construction illustrated is formed of two complemental pressed sheet-metal shell-halves 24 and 25 brazed together and having a union 26 brazed to the magneto-connection arm or end 27 of the elbow 23, and the retainer 28 is brazed to the other or spark-plug connection arm or end 29 of the elbow. If desired, the elbow-shell could be made of an integrally-formed shell.

The thus completed metal elbow-shell 23 is now placed in a die 30 formed of two complemental die-halves, the lower die-half of which is shown in Fig. 12, for molding plastic insulating material inside of the metal elbow-shell and around and in close relation with an electrical conductor or cable-connector insert 31 preferably made of stainless steel. The conductor 31 has a smooth semispherical end 32 at one end, and at the other end has a screw-threaded eye 33. The elbow-shell 23 and the conductor 31 are held together in spaced relation preparatory for the molding operation in a manner that will now be described.

The bushing 34 is screwed on the threaded end 35 of the union 26 as shown, a cavity-pin or bushing 36 has its reduced end 37 moved in through the bushing 34 and into the arm 27 of the elbow, whereupon a long screw 38 has its threaded end screwed into the screw-threaded eye 33 of the electrical conductor 31. A bushing 39 is placed in assembled relation on the retainer 28 of the other end 29 of the shell 23, and the pin or bushing 40 is slid into the end of the bushing 39 and over the end 32 of the electrical conductor 31. This whole assembly just described is placed in the die-half 30 shown, whereupon the upper or complemental die-half (not shown) is brought into close and secure engagement with the lower die-half, and moldable plastic material 41 is placed in the cylindrical opening 42 formed by the complemental die-halves, which are heated and the extrusion-plunger 43 is forced forward to cause the plastic material 41 to flow around and through the parts to the position shown. After removal of the elbow with its molded plastic material 41 from the associated holding parts, the plastic material is trimmed at the end of the elbow where it entered the elbow.

An annular annealed copper gasket 44 is shaped in place upon the annular flange portion 45 of the retainer 28. A generally-circular spring locking-ring or -clip 46 having a cutout portion 47, and a split spacing-ring 48 of generally-circular form having a cutout portion at the region indicated at the line 49 (Fig. 4) are slipped over the retainer 28, and a nut 50 is also slipped over the retainer 28 while the parts 46 and 48 are held contracted to permit the nut 50 to move over them, whereupon the split locking-ring 46 is permitted to expand outwardly into the annular recess 51 in the nut 50 to lock the nut 50 securely in place upon the retainer 28.

A split retainer-shell 52 having a cutout portion 53 (Fig. 3) and having an inner end-flange 54 formed of a plurality of radially-split sectors 55, is inserted into the molded opening 56 of the plastic 41 and has the split-end flange-sectors 55 forced into engagement with the adjacent cylindrical end portion of the molded-in conductor 31, whereupon the contact-spring 57 and the cap 58 for the contact-spring are inserted in place as shown in Figs. 1 and 2, and whereupon an outer end-flange 59 is formed upon the retainer-shell 52 to hold the parts in assembled relation.

The spark-plug end or arm of the connector 20 is now ready for connection to the spark plug 21 by connecting the screw-threaded end 60 of the latter with the screw-threaded end of the nut 50 with the annular brass ring or shell 61 of the spark plug 21 clamped in engagement with the copper gasket 44, with the electrical conductor 62 of the spark plug 21 pressed into engagement with the cap 58.

The electrical cable or conductor 22 that is to conduct the current from the spark-plug connector 20 to the magneto (not shown) or other source of electrical power, has a plurality of wires 63 surrounded by a soft rubber or rubber-like insulation 64 which may be of neoprene, the outer surface of the rubber 64 being covered with a braided or other textile covering coated with suitable flexible plastic insulating material 65.

The cable 22 has the wire ends 66 of wires 63 bared and bent back over the flexible plastic covering 65 as shown in Figs. 7 and 5, and has a cup-shaped metal cable-terminal 67 applied thereover and has an annular end-flange portion 68 forced inward as shown in Figs. 1 and 7 to clamp the cable-terminal 67 in place and in good electrical engagement with the wire ends 66.

The cable 22 now has its terminal 67 inserted through the braided metal-shield 69 and through the annular bushing 70 soldered to shield 69, on which bushing 70 is swiveled a nut 71, and is also inserted through a double conical soft rubber packing-member 72 and has its screw-threaded end 73 screw-threadedly engaged in the threaded eye 33 of the electrical conductor 31, whereupon the nut 71 is screwed firmly upon the union 26 to clamp the rubber packing-ring 72 between the conical surface 74 of the bushing 70 and the conical surface 75 formed on the end of the plastic liner or material 41.

The plastic material 41 may be phenol-formaldehyde resin, or a urea-formaldehyde resin such as melamine resin, or may be of soft rubber or rubber-like material, and preferably is of neoprene which is gasoline and oil resistant, or may be of Micalex which is a mica-containing composition made by the General Electric Company.

By having the cable-connector conductor or conductor-insert 31 secured tightly in place in spaced relation to the metal elbow-shell 23 by plastic insulating material molded in place to permanently hold the connector 31 in its insulated spaced relation relative to the shell, escape of any gas is prevented from the spark plug 21 through the spark-plug connector 20. Thus, there is no possibility of damaging the insulating quality of any soft rubber insulation of the wires of the cable 22 which leads to the magneto of the engine.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivancy range of the appended claims are intended to be embraced therein.

I claim:

A shielded spark-plug connector including: a hollow metal elbow having a spark-plug-connection arm for attachment to a spark plug and a current-supply-connection arm, the said elbow with its said arms forming a permanently-unitary member; a rod-like permanently-unitary electrical conductor that is gas-impervious to gas leaking through the spark-plug and permanently fixedly secured inside of and in insulated relation with said spark-plug-connection arm by means of plastic insulating material molded in place between and in gas-impervious contact with said gas-impervious conductor and said spark-plug-connection arm, with one end of said conductor adapted for connection to a spark plug and with its other end located in the elbow and coiled to form an eye which is internally threaded for connection with screw-threaded means on an electrical conductor inserted into said current-supply-connection arm and having insulated relation therewith; and plastic insulating material molded in place in said current-supply-connection arm with a passage for the insertion of said electrical conductor.

WILLIAM R. CURTISS.